J. F. FLAHERTY.
GAGING AND ASSORTING MACHINE.
APPLICATION FILED OCT. 23, 1911.
1,034,097.
Patented July 30, 1912.
5 SHEETS—SHEET 2.
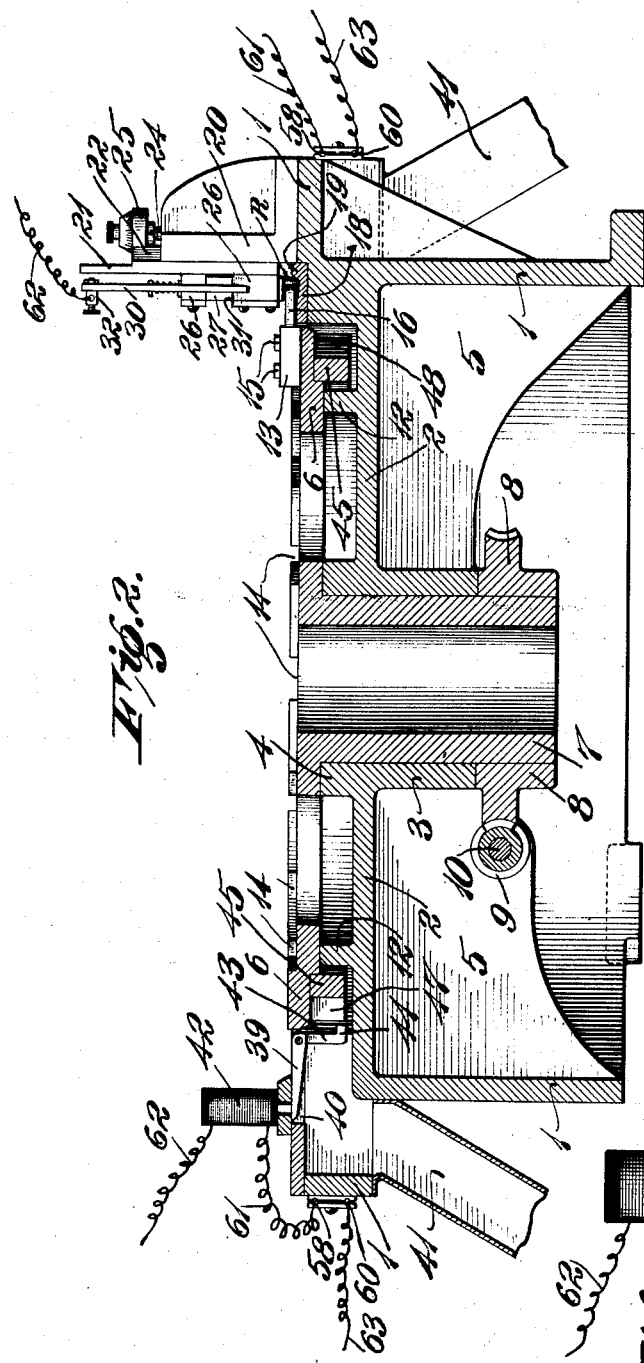
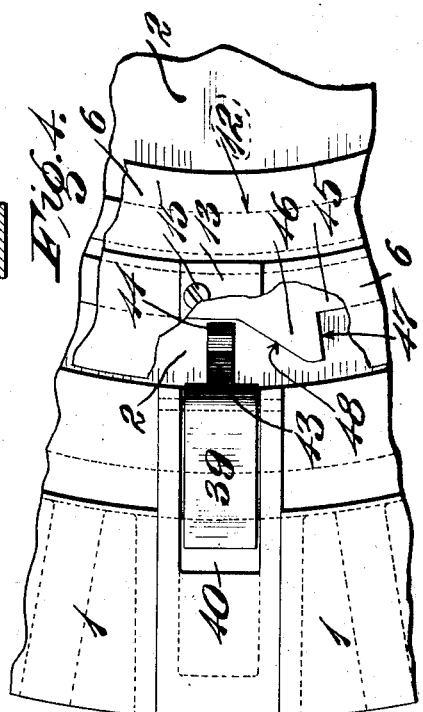
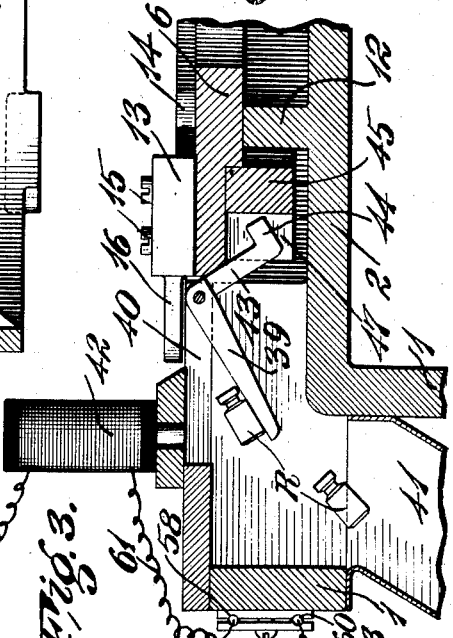
Witnesses:
Edgar T. Farmer
G. A. Pennington
Inventor:
John F. Flaherty,
By Cann & Cann
his Attys.

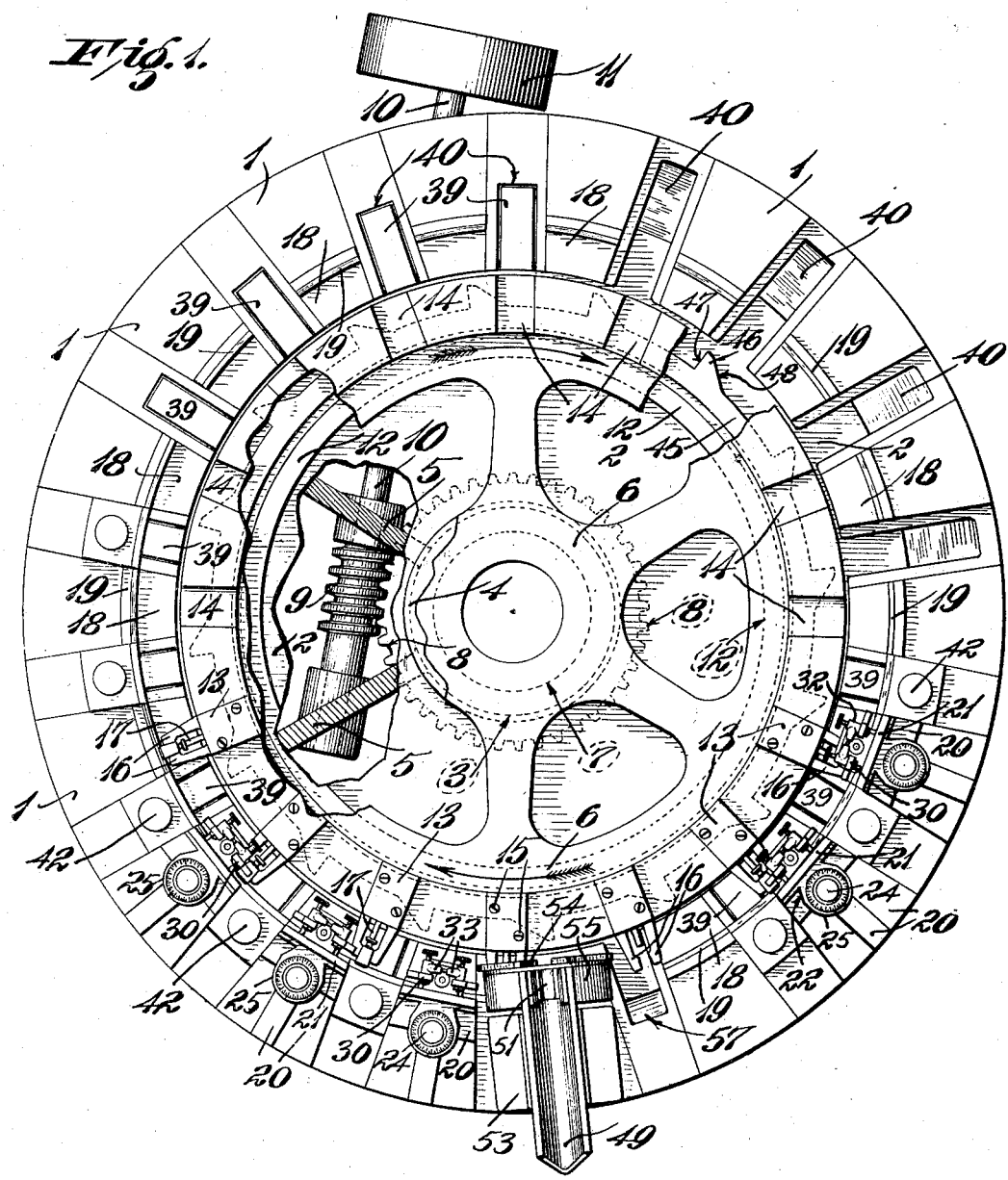

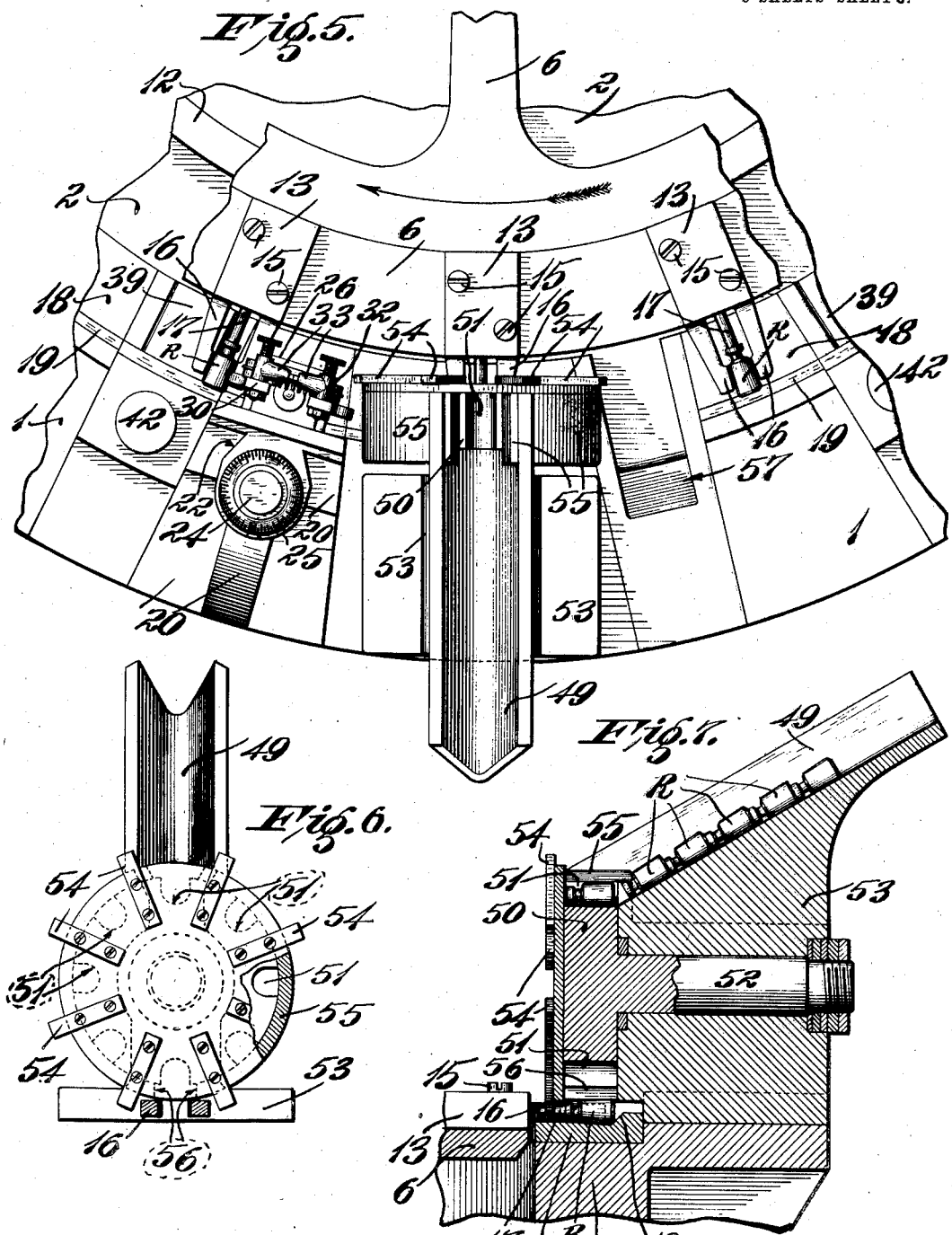

J. F. FLAHERTY.
GAGING AND ASSORTING MACHINE.
APPLICATION FILED OCT. 23, 1911.
1,034,097.
Patented July 30, 1912.
5 SHEETS—SHEET 4.
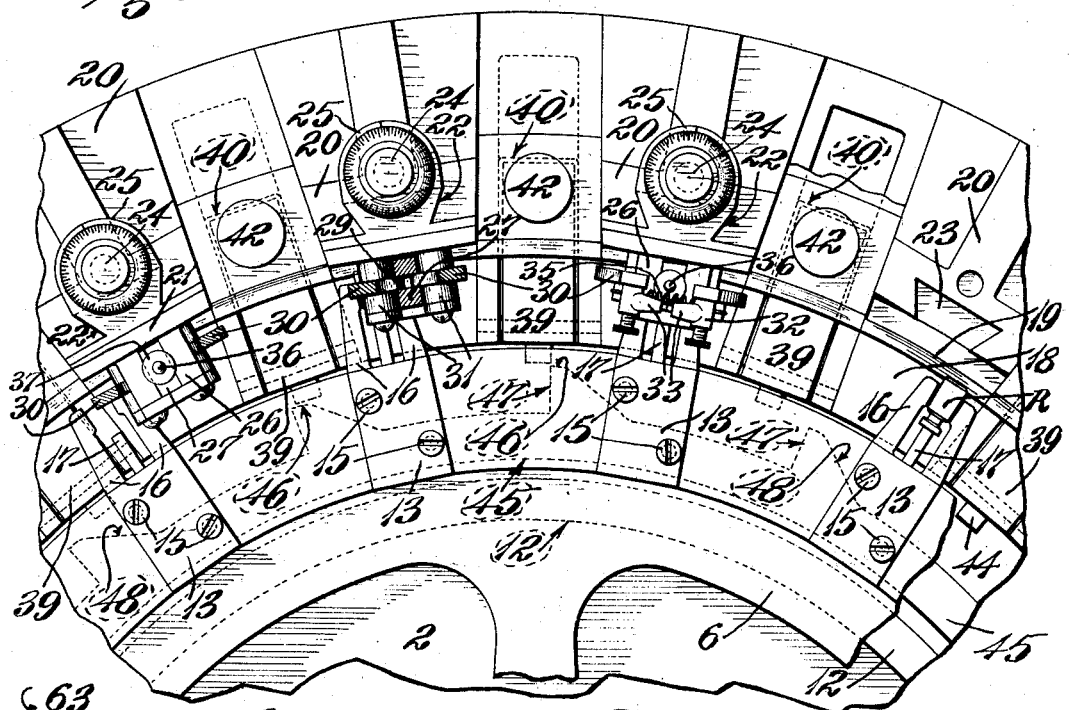
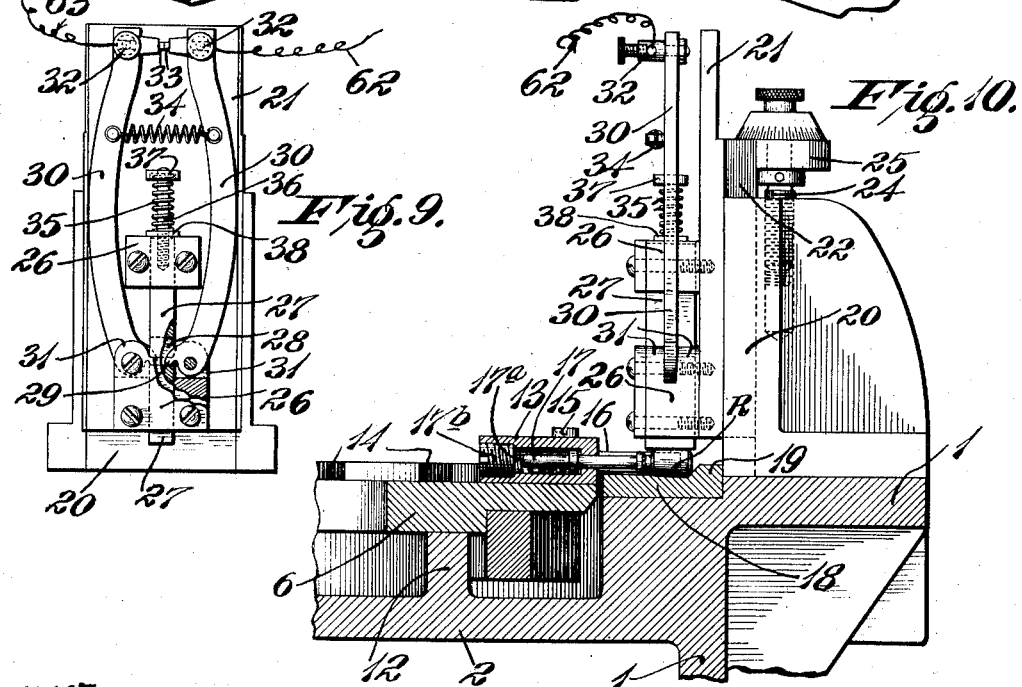
Witnesses:
Edgar J. Farmer
G. A. Pennington
Inventor:
John F. Flaherty,
By Court Carr
His Attys.

J. F. FLAHERTY.
GAGING AND ASSORTING MACHINE.
APPLICATION FILED OCT. 23, 1911.
1,034,097.
Patented July 30, 1912.
5 SHEETS—SHEET 5.
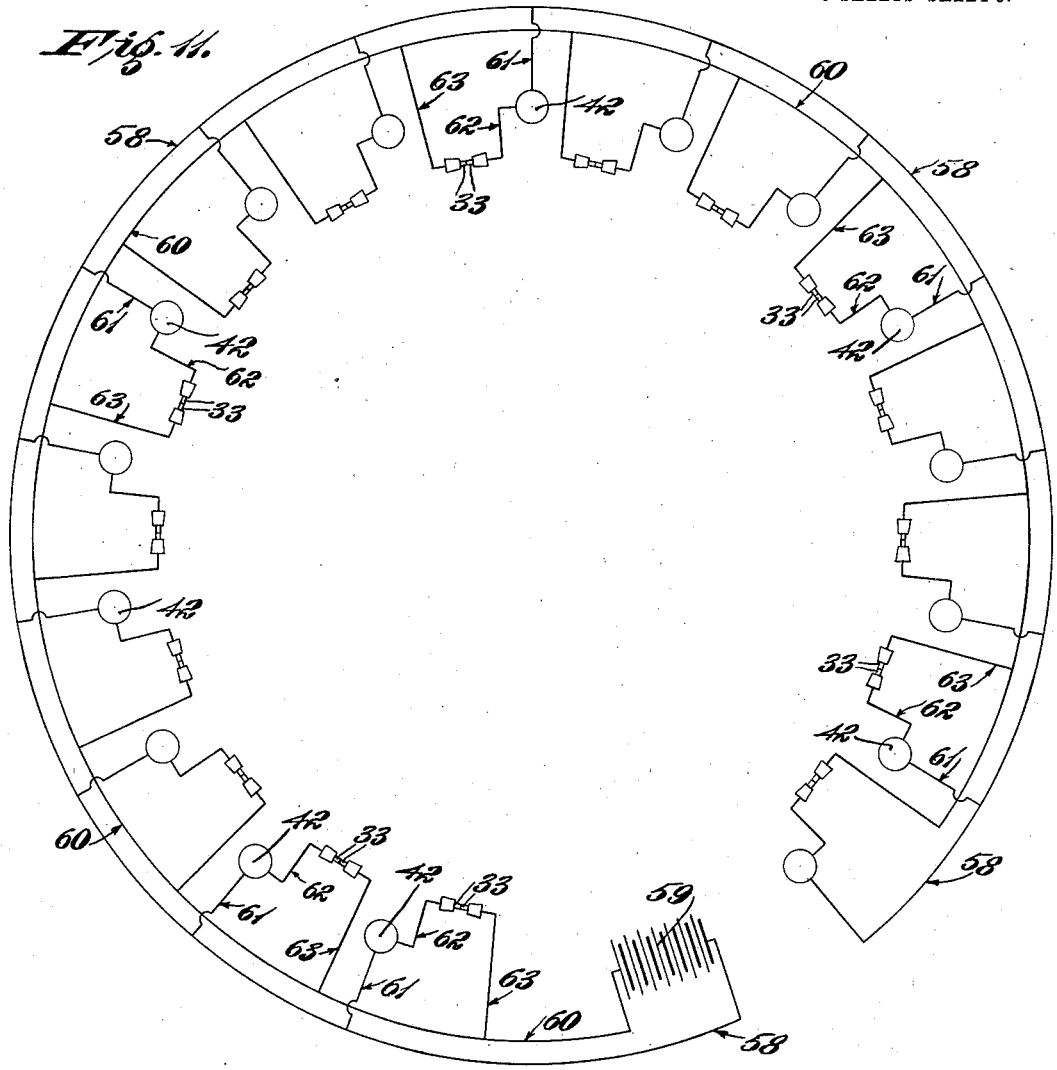
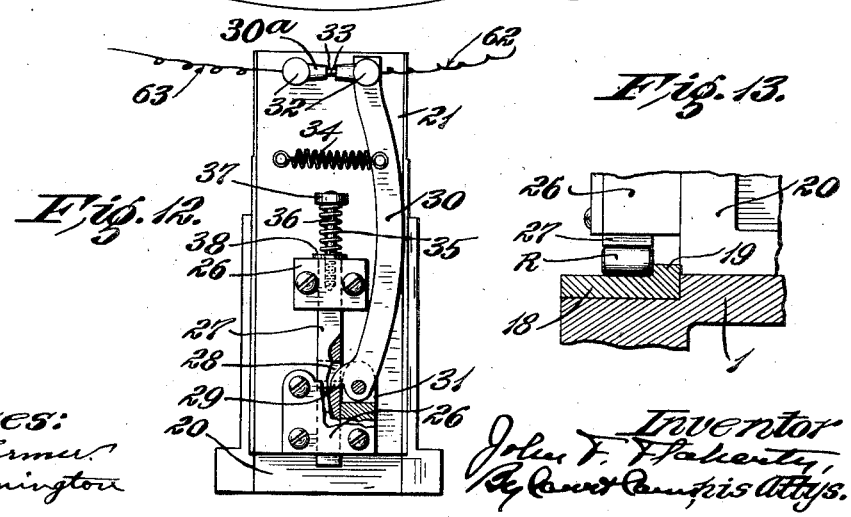

UNITED STATES PATENT OFFICE.

JOHN F. FLAHERTY, OF CANTON, OHIO, ASSIGNOR TO THE TIMKEN ROLLER BEARING COMPANY, OF CANTON, OHIO, A CORPORATION OF OHIO.

GAGING AND ASSORTING MACHINE.

1,034,097.          Specification of Letters Patent.       Patented July 30, 1912.

Application filed October 23, 1911. Serial No. 656,115.

*To all whom it may concern:*

Be it known that I, JOHN F. FLAHERTY, a citizen of the United States, and a resident of the city of Canton, in the county of Stark and State of Ohio, have invented a new and useful Improvement in Gaging and Assorting Machines, of which the following is a specification.

This invention relates to gaging and assorting machines and has for its principal objects to produce a machine which will automatically gage and assort bearing rollers and the like with exact nicety, and to attain certain advantages which will hereinafter more fully appear.

The invention consists in the parts and in the arrangements and combinations of parts hereinafter described and claimed.

In the accompanying drawings which form part of this specification and wherein like symbols refer to like parts wherever they occur, Figure 1 is a plan view of a machine embodying said invention, some of the parts being removed and others shown in section; Fig. 2 is a vertical section through the machine; Fig. 3 is a fragmentary section, on an enlarged scale, through the base portion of the machine adjacent to a trap door, showing the action of the latter; Fig. 4 is a plan view of some of the parts shown in Fig. 3; Fig. 5 is a fragmentary plan view showing the feed hopper; Fig. 6 is a face view of the feeding disk which coöperates with the hopper, parts being shown in section; Fig. 7 is a vertical section through the hopper and feeding disk; Fig. 8 is a fragmentary plan view showing the relation of the roll carriers, gage elements and trap doors; Fig. 9 is a front elevation of one of the gage elements detached, parts being shown in section; Fig. 10 is a fragmentary view, partly in section and partly in side elevation, showing the coöperative relation of a roll carrier and gage element; Fig. 11 is a diagram of the electrical circuits; Fig. 12 is a view similar to Fig. 9 showing a single lever arm coöperating with a fixed contact piece; and Fig. 13 is a view similar to Fig. 10 showing a modification adapted for plain cylindrical rolls.

The machine illustrated in the drawings comprises a circular base 1 whose top portion 2 is depressed and provided at its center with a cylindrical bearing 3. This cylindrical bearing projects a slight distance above the top portion 2, as at 4, and also a considerable distance below said top portion 2. The lower portion of the bearing 3 is connected to the circular wall of the base by radial webs 5.

Mounted on the base is a revolving table 6 having a central journal extension 7 which is fitted in the bearing 3. A worm wheel 8 is fixed on the lower end portion of the journal member 7 and meshed with a worm screw 9 fixed on a driving shaft 10. The driving shaft is provided with a pulley 11 which may be obviously belted to any suitable power shaft, not shown.

The peripheral portion of the revolving table 6 rides on an annular flange or rib 12 projecting up from the top 2 of the base; and disposed about the peripheral portion of the upper face of the table are a series of roll-carriers 13. These roll-carriers comprise rectangular body portions which are inserted in grooves or recesses 14 provided therefor in the top of the table 6 and secured by screws 15. Projecting from the body portion of each of the roll-carriers are a pair of fingers 16, between whose end portions the rollers R to be gaged are received in a manner hereinafter more fully appearing. The body portions of the roll-carriers are bored on lines extending radially from the center of the table and medially between the fingers, and in these bores are fitted spring-pressed plungers 17 which project beyond the periphery of the table between said fingers 16 so as to bear against the ends of rollers received in the carriers.

The base of the machine has on its upper face an annular series of hardened metal plates 18 which are located close to the periphery of the revolving table 6 so that the fingers 16 on the roll-carriers 13 pass thereover. These plates 18 are provided with shoulders 19 at their outer edges against which the outer ends of the rollers R are held by the spring-pressed plungers 17, the tension of whose springs 17ª may be varied by adjusting the plugs 17ᵇ at the inner ends of the roll-carriers.

In cases where the rollers to be gaged are of the tapered bearing roller type having beveled ends, as shown, the plates 18 are preferably provided with inclined top surfaces corresponding to the taper of the rollers, or inclined to such an extent that the highest parts of the respective rollers are horizontal when they are upon the plates; and the inner faces of shoulders 19 are preferably beveled to correspond to bevel of the ends of the rollers which abut thereagainst. However, in cases where the machine is adapted for cylindrical rollers, the plates 18 will have level top surfaces and the shoulders 19 may have perpendicular inner faces as shown in Fig. 13.

Mounted adjacent to each hardened metal plate 18 is a gage element comprising a supporting bracket 20 on which is mounted a vertically adjustable member 21. The adjustable member 21, as shown, is provided with a dovetail rib 22 which works in a counterpart vertical groove 23 in the bracket member 20. A micrometer screw 24 works in the bracket member 20 and is swiveled to a lug 25 on the supporting member 21 so that the latter may be adjusted to and supported at different heights.

Slidably mounted on lugs 26 projecting from the front face of the supporting member 21 is a plunger 27. This plunger is provided with a transverse slot 28 into which fingers 29 on lever arms 30 project from opposite sides of the plunger. The lever arms 30 are pivoted between ears or lugs 31 on the lower lug 26 of the supporting member 21; and the ends of the fingers 29 are normally substantially in the horizontal plane of the axes of the pivots for said lever arms 30.

The lever arms 30 are extended up a considerable distance above the upper end of the plunger 27 and are provided with binding posts 32 to receive the ends of the electrical circuit wires, as hereinafter set forth. Contact points 33 project inwardly from these binding posts and a spring 34 connects the two lever arms 30 so as to yieldingly hold them with the points 33 in contact with each other. The plunger 27 is yieldingly held in raised position by a spring 35 which is of weaker tension than the spring 34 and sleeved over a reduced extension 36 on said plunger and interposed between a head 37 fixed on said reduced extension and a washer 38 resting on the upper lug 26 and through whose perforations said reduced extension 36 slides. By this construction, the plunger is held by the spring 35 so that the bottom end of the slot 28 bears continuously against the fingers 29 on the lever arms 30. When the plunger 27 is raised, the lower end of the slotted portion bearing against said fingers 29, causes the lever arms 30 to swing away from each other against the tension of the spring 34 and thus break the contact between the points 33, thereby breaking the electrical circuit as will hereinafter more fully appear. Obviously, however, instead of providing a pair of the lever arms 30 as shown in Fig. 9, in some cases a single movable arm may be used in connection with a fixed contact piece 38 in lieu of the opposite movable member as shown in Fig. 12.

As illustrated in the drawings, the respective hardened metal plates 18 and their companion gage elements are spaced equi-distant apart, and interposed between the respective sets of coöperative plates and gages are trap doors 39 which normally close the openings 40 above hoppers or chutes 41. Obviously the latter may communicate with receptacles to collect the rollers that are gaged and assorted. Above the outer end portion of each of the trap doors is an electro-magnet 42 whose electrical circuit is normally closed by the contact points 33 of the gage element directly adjoining the trap door on one side. That is, for each gage there is a companion trap door, the circuit of whose magnet is controlled by that particular gage; and as soon as a roller of the right size passes under the plunger and raises it, thereby breaking the electrical circuit, the companion trap door will drop by its own weight. Hence, the roller falls into the opening when carried to it by the roll-carrier.

Each of the trap doors 39 is provided with an angular downward extension 43 whose lower end portion is turned inwardly, as at 44. On the under side of the revolving table 6 is a ratchet wheel or cam ring 45. This wheel or ring 45 is provided with a multiplicity of peripheral projections or teeth 46. Each of the projections 46 is provided with a radial face 47 and an inclined or cam face 48. There is a projection 46 provided for each of the roll carriers 13 and the respective projections are set a slight distance back of said roll carriers with respect to the direction of rotation of the table; or, in other words, the projections are so correlated to the roll carriers, that just after a trap door has been dumped to discharge the roller which has effected its release into the chute, the cam projection 46 associated with that particular roll-carrier engages the lower end portion of the extension 43 of the trap door and thereby raises the latter to normal position before the next following roll carrier moves into coöperative relation thereto. The contact members on the lever arms of the gage element which has previously effected the release of the trap door having closed the electrical circuit, the magnet will hold said trap door in its raised position.

In practice, the plungers 27 of the respective gage elements are adjusted to the several different sizes required. The plunger of the first gage element is set to the largest size and that of each succeeding element a size smaller. For example, the gages may each have a micrometer dial or scale so that they may be set to assort rollers accurately in progressively different sizes.

The machine may be arranged with any desirable number of gage elements and companion trap doors, and also any desirable number of roll-carriers. The rollers may be placed in the roll-carriers by hand, but it is preferable to provide an automatic feeding device. As shown in the drawings, the feeding device comprises a hopper or inclined chute 49 whose lower end portion communicates with a feeding disk 50. The feeding disk is provided with a multiplicity of peripheral notches or pockets 51, each just large enough to receive only a single roller. This feeding disk is fixed on a spindle 52 journaled horizontally in the bracket 53 which supports the feed hopper or chute 49.

The feeding disk is provided with a multiplicity of fingers 54 extending radially beyond the peripheral portion thereof so as to be engaged by the projecting fingers 16 of the roll-carriers 13 on the revolving table 6, there being a number of the fingers 54 corresponding to the number of pockets 51 in the feeding disk. The feeding disk 50 is surrounded by a cylindrical shell or casing 55 except at the top where the hopper or chute 49 communicates therewith and at the bottom where an opening 56 is provided. Thus the rollers which are successively received in the pockets 51 of the feeding disk are held in the respective pockets until the opening 56 is reached, whereupon the rollers drop between the fingers 16 of the roll-carriers as the latter are successively moved under the feeding disk.

The receptacles which communicate with the respective assorting chutes are not shown because any desirable and obvious arrangement of receptacles may be employed for receiving the assorted rollers.

In Fig. 11, I have shown a diagram of the wiring for the several magnet circuits. A wire 58 is connected to one pole of a battery or terminal of a source of electrical energy 59 and a wire 60 is connected to the opposite pole or terminal thereof. The respective magnets 42 are connected by wires 61 to the wire 58 and by wires 62 to one of the pair of contact points 33 of the respective gage elements. The opposite contact points are connected by wires 63 to the wire 60. In practice, the wires 58 and 60 may be looped around the supporting base of the machine and suitably insulated therefrom.

In practice, the first gage next adjacent to the feeding device to the front with respect to the direction of travel of the roll-carriers, is used as an "oversize" gage. That is, all rollers above a certain size raise the plunger and are dumped into the adjoining opening whose trap door is released by the actuation of the gage. All rollers under that size are passed on to the progressively graduated gages and assorted according to their respective sizes.

Preferably, next adjoining the feeding device, on the rear side thereof, is an outlet opening or chute 57, so that any rollers which are too small to be gaged by the last gage of a series, will drop from the roll-carrier without being carried around the circuit again and again.

What I claim is:

1. A roll gaging machine comprising a base, a runway thereon, said runway having a positioning portion, two or more gages in coöperative relation to said runway, being set respectively for a different size of roll, a member movable with respect to said runway and arranged to move rolls upon the latter into coöperative relation to said gages successively, and means for holding the rolls in contact with said positioning portion of the runway.

2. A roll gaging machine comprising a base, a runway thereon having a series of normally closed outlets therein, two or more gages in coöperative relation to said runway, being set respectively for a different size of roll, a member movable with respect to said runway and arranged to move rolls upon the latter into coöperative relation to said gages successively, said outlets being respectively associated with said gages in coöperative pairs and the closure for a particular outlet being controlled by its companion gage so as to automatically open and deliver a roll from the carrier after the gage has determined the size of the roll, and means on said movable member for restoring the respective closures to normal position.

3. A roll gaging machine comprising a base, a circular runway thereon, a circular series of gages on said base above said runway in coöperative relation thereto and adapted to measure the diameter of the roll, said gages being set respectively for progressively different sizes, a revolving member, means on the peripheral portion of said revolving member adapted to travel over said runway and move rolls upon the latter into coöperative relation to said gages successively, said runway having a series of outlet openings therein, said outlet openings being provided with gravitating trap doors, means for releasably holding said trap doors normally in closed position, said outlet openings being respectively interposed between said gages and associated therewith in coöperative pairs and the releasable holding means for the trap doors being controlled by the respective gages, so that after a roll has been gaged by a particular gage the trap door of the companion outlet opening is automatically released to deliver the roll from said runway.

4. A roll gaging machine comprising a base, a circular runway thereon, a circular series of gages in coöperative relation to said runway, said gages being set respectively for progressively different sizes, a revolving member in coöperative relation to said runway, means on said revolving member arranged to move over said runway so as to move rolls upon the latter into coöperative relation to all of said gages, a feeding device located in coöperative relation to said runway, and means on said feeding device adapted to be intermittently engaged by the revolving member so that said feeding device is actuated to deliver rolls to said runway intermittently to be engaged by the roll-moving means successively.

5. A roll gaging machine comprising a base, a circular runway thereon, a circular series of gages in coöperative relation to said runway, said gages being set respectively for progressively different sizes, a revolving member in coöperative relation to said runway, a series of peripheral elements on said revolving member arranged to move over said runway so as to move rolls upon the latter into coöperative relation to all of said gages, a revolving feeding device located in coöperative relation to said runway, and means on said feeding device adapted to be intermittently engaged by the peripheral elements on said revolving member so that said feeding device is actuated to deliver rolls to said runway intermittently to be engaged by the peripheral elements on said revolving member successively.

6. A roll gaging machine comprising a base, a runway thereon, a series of gages in coöperative relation to said runway, said gages being set respectively for a different size of roll, a member movable with respect to said runway and arranged to move rolls upon the latter into coöperative relation to said gages successively, and a feeding device in coöperative relation to said runway, said feeding device having means adapted to be engaged by said movable member intermittently.

7. A roll gaging and assorting machine comprising a supporting base, a circular series of gages mounted on said supporting base, said gages being set respectively for progressively different sizes of rollers, beginning with the largest size and successively diminishing to the smallest, a roll outlet adjoining each of said gages in coöperative relation thereto, separate releasable closures for the respective outlets controlled by the respective gages which are associated therewith, a revolving support, a circular series of roll-carriers arranged on said support to travel in coöperative relation to all of said gages and roll outlets, and a roll outlet independent of control by any of said gages and adapted to effect the release from said roll carriers of all rolls of smaller size than the smallest roll for which any of said gages are set.

8. A roll gaging and assorting machine comprising a series of gages set respectively for progressively different sizes of rollers, beginning with the largest size and successively diminishing to the smallest, said gages each comprising a bed plate, a vertically movable plunger above said bed plate, means for adjusting said plungers and yieldingly holding them normally at different heights above said bed plate, an interposed series of roll outlets respectively associated with said bed plates in coöperative pairs, releasable means for normally closing said roll outlets, said means being controlled by the respective coöperative gage elements, whereby, when a roller is gaged by one of the gage elements the closure for the coöperative roll outlet is automatically released, a traveling support, and a series of roll carriers arranged on said support to travel in coöperative relation to all of said gage elements and roll outlets.

9. A roll gaging and assorting machine comprising a series of gages set respectively for progressively different sizes of rollers, beginning with the largest size and successively diminishing to the smallest, said gages each comprising a bed plate, a vertically movable plunger above said bed plate, means for adjusting said plungers and yieldingly holding them normally at different heights above said bed plate, an interposed series of roll outlets respectively associated with said bed plates in coöperative pairs, releasable means for normally closing said roll outlets, said means being controlled by the respective coöperative gage elements, whereby, when a roller is gaged by one of the gage elements the closure for the coöperative roll outlet is automatically released, a traveling support, a series of roll carriers arranged on said support to travel in coöperative relation to all of said gage elements and roll outlets, and automatic means for restoring said closing means of the respective roll outlets before each succeeding roll carrier moves into coöperative relation to said outlets.

10. A roll gaging and assorting machine comprising a series of gages set respectively for progressively different sizes of rolls, said gages each comprising a bed plate, a vertically movable plunger mounted above the respective bed plates, means for adjusting and yieldingly holding said plungers normally at different elevations above said bed plates, an interposed series of roll outlets, said roll outlets being respectively associated with the gages in coöperative pairs, trap doors arranged to normally close said roll outlets, and electro-magnets arranged to normally hold said trap doors in closed position, the electrical circuits of the respective magnets being controlled by the respective coöperative gage elements so that the electrical circuit is broken automatically and the magnet deënergized to release a particular trap door as a roll is gaged by the coöperative gage element.

11. A roll gaging and assorting machine comprising a series of gages set respectively for progressively different sizes of rolls, said gages each comprising a bed plate, a vertically movable plunger mounted above the respective bed plates, means for adjusting and yieldingly holding said plungers normally at different elevations above said bed plates, an interposed series of roll outlets, said roll outlets being respectively associated with the gages in coöperative pairs, trap doors arranged to normally close said roll outlets, electro-magnets arranged to normally hold said trap doors in closed position, the electrical circuits of the respective magnets being controlled by the respective coöperative gage elements so that the electrical circuit is broken automatically and the magnet deënergized to release a particular trap door as a roll is gaged by the coöperative gage element, a traveling support, a series of roll carriers on said support adapted to travel in coöperative relation to all of said gage elements and trap doors, and automatic means for restoring said trap doors before each succeeding roll-carrier moves into coöperative relation to the roll outlet.

12. A roll gaging and assorting machine comprising a series of gages set respectively for progressively different sizes of rollers, said gages each comprising a bed plate, a vertically movable plunger mounted above said bed plates, means for adjusting and yieldingly holding said plungers normally at different elevations above said bed plates, an interposed series of roll outlets, said roll outlets being respectively associated with the respective gages in coöperative pairs, trap doors arranged to normally close said roll outlets, electro-magnets arranged to normally hold said trap doors in closed position, the electrical circuits of the respective magnets being controlled by the respective coöperative gage elements so that the electrical circuit is broken automatically and the magnet deënergized to release a particular trap door as a roll is gaged by the coöperative gage element, a traveling support, a series of roll carriers on said support adapted to travel in coöperative relation to all of said gage elements and trap doors, automatic means for restoring the respective trap doors, and means for feeding rollers to said roll carriers.

13. In a roll gaging and assorting machine, a gage comprising a bed plate, a vertically movable plunger mounted above said bed plate in coöperative relation thereto, a pair of lever arms pivotally connected to said plunger, electrical contact members on said lever arms, resilient means connecting said lever arms so that said contact members are normally held in contact with each other, a roll outlet adjoining said bed plate, a closure for said roll outlet, an electromagnet adapted to hold said closure normally in closed position, said magnet and said contact members being in the same circuit so that when a roller is moved between said bed plate and said plunger and the latter is raised, said contact members are moved apart and the circuit is broken and the magnet deënergized and the closure of the roll outlet is free to open.

14. A roll gaging and assorting machine comprising an annular series of gages, an annular series of roll outlets interposed between said gages, the respective gages and roll outlets being arranged in coöperative pairs, each of said roll outlets being provided with a gravitating trap door, electromagnets arranged to normally hold the trap doors closed, the electrical circuits of each magnet being controlled by the gage which is associated with its particular outlet, so that when the gage is actuated by a roll being gaged the electrical circuit is broken and the magnet deënergized and the trap door opens, an annular series of roll carriers adapted to move successively into coöperative relation to all of said gages and roll outlets, an annular series of cam elements arranged to travel with said roll carriers, and means on said trap doors adapted to be engaged by said cam elements to lift the trap doors into the zone of the respective electromagnets, said cam elements being respectively correlated with said roll-carriers so as to effect the restoration of a released trap door before a succeeding roll-carrier moves into coöperative relation to the particular roll outlet.

15. In a roll gaging machine, a circular series of gages each comprising a bed plate having a shoulder at its circumferential end, a revolving support, a roll-carrier on said support having an open roll-receiving portion adapted to travel over said bed plates, and means on said roll-carrier adapted to hold a roll in said carrier in contact with said shoulder on the bed plate.

16. In a roll gaging machine, a circular series of gages each comprising a bed plate having a shoulder at its circumferential end, a revolving support, a roll-carrier on said support having an open roll-receiving portion adapted to travel over said bed plates, and yielding means on said roll-carrier adapted to hold a roll in said carrier in contact with said shoulder on the bed plate.

17. In a roll gaging machine, a gage comprising a bed plate having a shoulder at its end and a vertically movable member above said bed plate, a traveling support, a roll carrier on said support adapted to move a roll to be gaged between said bed plate and vertically movable member, and means for holding the roll in contact with said shoulder on the bed plate as it moves over the latter.

18. In a roll gaging machine, a gage comprising a bed plate having a shoulder at its end and a vertically movable member above said bed plate, a traveling support, a roll carrier on said support adapted to move a roll to be gaged between said bed plate and vertically movable member, and resilient means on said roll carrier for holding the roll in contact with said shoulder on the bed plate as it moves over the latter.

Signed at Canton, Ohio, this 19th day of October, 1911.

JOHN F. FLAHERTY.

Witnesses:
F. W. CRANKSHAW,
AUSTIN LYNCH.